3,790,510
FOAMABLE PLASTISOL COMPOSITION CONTAINING A FOAM STABILIZER, AND FOAMED COMPOSITION OBTAINED THEREFROM
William Tait Flannigan, Kilwinning, Scotland, assignor to Imperial Chemical Industries Limited, London, England
Filed Nov. 13, 1972, Ser. No. 305,659
Claims priority, application Great Britain, Nov. 22, 1971, 54,120/71
Int. Cl. C08j 1/16
U.S. Cl. 260—2.5 P                   6 Claims

ABSTRACT OF THE DISCLOSURE

New organopolysiloxane pro-foamers for use in thermoplastic resin plastisols, especially vinyl chloride polymer plastisols, consisting of mono-, tri- and tetrafunctional siloxanyl units in specific ratio ranges, plastisols containing these and foams produced therefrom.

---

Figure 1:
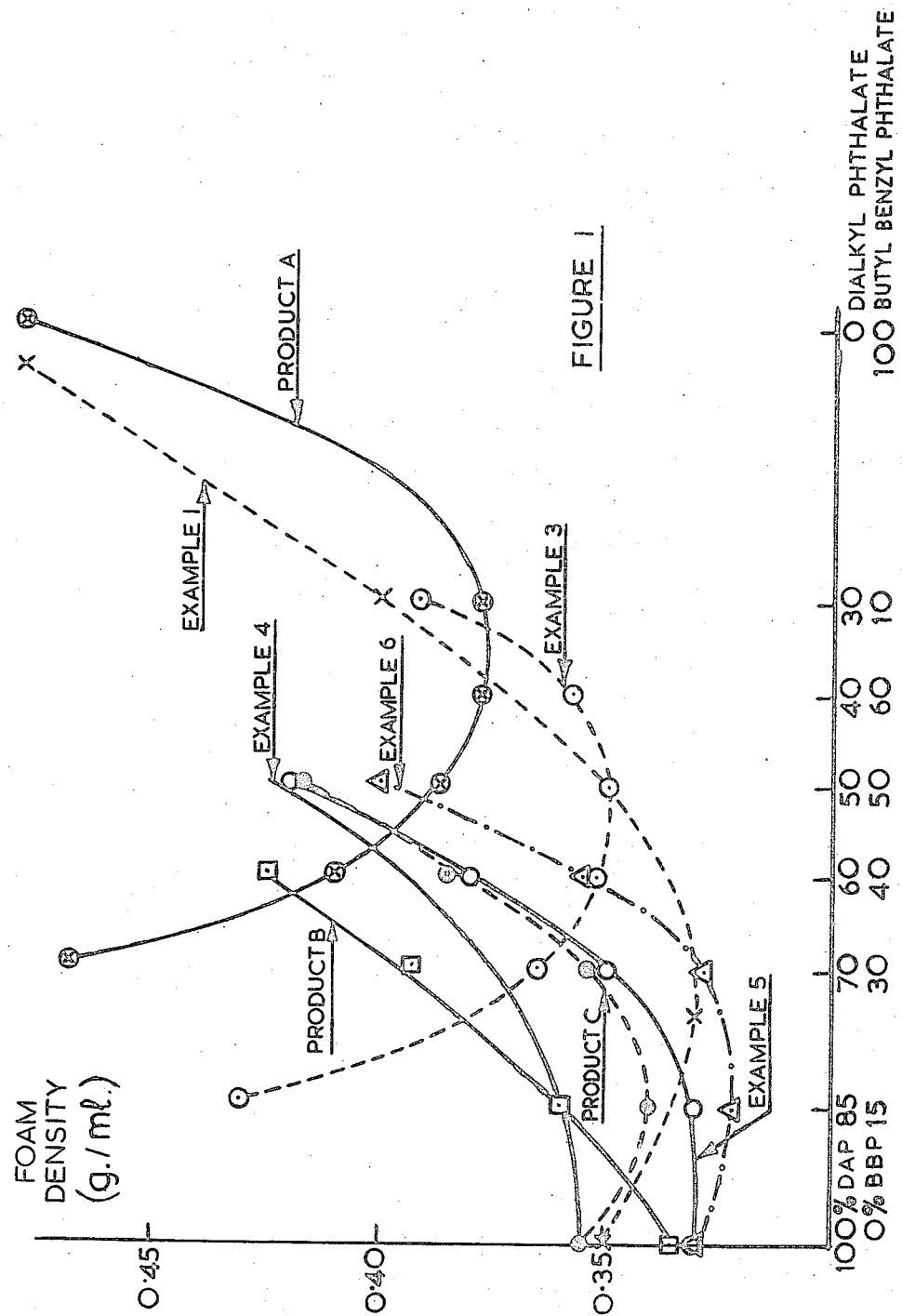

The present invention relates to foams, foam stabilizers, compositions suitable for the production of foams, a process for making foams and foam covered articles.

It is well known in the plastics industry to prepare foams from plastosols, particularly from plastisols based on vinyl chloride polymers. Such foams find utility in a variety of applications; e.g. furniture, bedding, carpets and clothing.

The plastisols from which these foams are prepared are themselves well-known materials and are comprised of mixtures of finely powdered thermoplastic resins, e.g. vinyl chloride polymers, and high boiling organic liquids known as plasticizers. Th powdery resins are virtually insoluble in these plasticizers at ordinary room temperatures but will readily dissolve therein at elevated temperature to form a single phase which on cooling solidifies to a solid plasticized material.

In the preparation of a liquid foam, the plastisol, before heating to an elevated temperature, is subjected to mechanical agitation to entrain a gas or vapor, usually air, therein. This may be achieved for example by mechanically heating or whipping the plastisol at room temperature and atmospheric pressure or by injecting compressed air into the mechanically agitated plastisol. This latter procedure usually allows greater quantities of air to be entrained in the liquid foam. The foam thus produced is then further treated by gelation and fusion at an elevated temperature so that an open celled foam structure is obtained, followed by cooling to develop the strength of the foam. In general, the more air that is incorporated into the foam, the lower the density of the resulting solid.

It is found, however, that the air bubbles in a foam produced from a plastisol usually tend to collapse very rapidly after the foam has been formed; usually too quickly in fact to enable the foam to be moved to the heating area and/or to retain its identity during gelation and fusion. To overcome this difficulty the plastisol is normally prepared with a foam stabilizer or mixture of foam stabilizers incorporated therein. These foam stabilizers are also known as profoamers and the two terms will be used interchangeably throughout this specification. The effect of a profoamer is to stabilize the gas bubbles in the foamed plastisol for a sufficiently long period to enable subsequent processing to be carried out. The profoamer also aids the even dispersion of the gas throughout the plastisols to produce a uniform foam with a minimal number of excessively large bubbles.

Well established profoamers are those based on silicone resins such as those described in United Kindom patent specification No. 1,168,233 which comprise a toluene-soluble siloxane copolymer resin consisting essentially of $R_3SiO_{1/2}$ and $SiO_{4/2}$ units where R is an alkyl radical or a monocyclic aryl hydrocarbon radical which may optionally be halogenated. Other siutable silicone resins are those described in United Kindom patent specification No. 1,023,203 which consist of $SiO_{4/2}$ units and units selected from $(CH_3)_3SiO_{1/2}$ and $Q(CH_3)_2SiO_{1/2}$ units wherein Q is a radical containing a solubilizing group such as a carboxyl, ester, amide, amino or mercapto group.

As mentioned above, the density of a foam decreases with the quantity of air that is entrained therein. There will, however, always be a lower limit of foam density that can be achieved from any given plastisol composition depending on the nature of that composition, since any profoamer or mixture of profoamers will only be able to stabilize a certain amount of air (depending on the particular profoamer or mixture of profoamers). In many industrial applications e.g. carpet backing, it is desirable for the foam density of the foamed material being produced to be very low and indeed such applications often have low density requirements that need to be met by the foam manufacturer. In addition, it is often advantageous in such applications to be able to have the choice of using a wide range of plasticizers and plasticizer mixtures in order to optimize other important parameters such as plastisol viscosity, gelation temperature and, of course, cost.

Such optimization may be particularly conveniently brought about by the use of plasticizer mixtures and in any particular plasticizer mixture system that is being used it is particularly desirable to be able to have the choice of using a wide range of relative proportions of each component in order to achieve the optimum combination of properties required for the particular foam being produced. However, the necessity of meeting a low foam density requirement when using a particular profoamer may well limit the choice of plasticizer, plasticizer mixture or range within a plasticizer mixture that may be used, since the effectiveness of a specific profoamer or mixture of profoamers in the attainment of low foam density is often determined to a significant extent by the nature of the plasticizer system being used.

We have in fact found that the presently available polysiloxane profoamers often suffer from the disadvantage that when used to stabilize foamed plastisols produced from a mixture of plasticizers, it is necessary to use a narrow optimized range of relative proportions of each plasticizer within the plasticizer mixture in order to achieve a given low density requirement for the foam being produced. Because of this, it is difficult for the foam manufacturers to achieve the optimization of the other important properties of the foam by variation of the components of the plasticizer mixture as mentioned hereinbefore.

We have now found that certain polysiloxane copolymer profoamers which differ in their composition from the presently available profoamers do not suffer from the above-mentioned disadvantage and enable foams of low density to be obtained from a plastisol made using a plasticizer mixture over a wide range of relative proportions of the components of the plasticizer mixture.

Therefore according to the present invention we provide a foam stabilizer suitable for use in the production of foams from plastisols which stabilizer consists of at least one copolymer consisting of $R_3SiO_{1/2}$ units, $RSiO_{3/2}$ units and $SiO_{4/2}$ units wherein R is a radical as hereinafter defined and the ratio of monofunctional units to the total tri- and tetra-functional units is within the range 0.6/1 to 1.5/1 and the ratio of said tri-functional units to said tetrafunctional units is within the range 0.05/1 to 1/1.

We also provide a composition suitable for making foams comprising a plastisol of a thermoplastic resin and at least one copolymer dispersed therein, said copolymer consisting of $R_3SiO_{1/2}$ units, $RSiO_{3/2}$ units and $SiO_{4/2}$ units wherein R is a radical as hereinafter defined and the ratio of monofunctional units to the total tri- and tetrafunctional units is within the range 0.6/1 to 1.5/1 and the ratio of trifunctional units to tetrafunctional units is within the range 0.05/1 to 1/1.

We further provide a process for the production of a solid thermoplastic foam comprising:

(a) forming a plastisol of a thermoplastic resin having at least one copolymer dispersed therein which copolymer consists of $R_3SiO_{1/2}$ units, $RSiO_{3/2}$ and $SiO_{4/2}$ units wherein R is a radical as hereinafter defined and the ratio of monofunctional units to the total tri- and tetrafunctional units is within the range 0.6/1 to 1.5/1 and the ratio of tri-functional units to tetra-functional units is within the range 0.05/1 to 1/1, (b) foaming said plastisol with a gas or vapor and thereafter (c) heating the foam so produced to cause the gelation and fusion thereof and then cooling the fused foam.

In the polysiloxane copolymer profoamers of our invention, the radical R may be an alkyl radical, a monocyclic aryl hydrocarbon radical, an alkaryl radical or an aralkyl radical. Examples of such radicals include methyl, ethyl, propyl, butyl, isopropyl, phenyl, benzyl, tolyl and xylyl. We have found that methyl radicals are particularly suitable. The profoamers of our invention may comprise a single polysiloxane copolymer as hereinbefore defined or may be a mixture of such copolymers.

Any suitable thermoplastic resin may be used to make plastisols used in the foamable compositions of our invention. Particularly preferred thermoplastics include vinyl chloride polymers. By the term "vinyl chloride polymers" we mean vinyl chloride homopolymers and vinyl chloride copolymers, the latter comprising vinyl chloride copolymerized with a minor amount of one or more copolymerizable ethylenically unsaturated comonomers. Such comonomers include, for example, unsaturated esters such as vinyl acetate; alkyl acrylates such as methyl acrylate, ethyl acrylate and butyl acrylate; alkyl methacrylates such as methyl methacrylate, ethyl methacrylate and butyl methacrylate; esters of unsaturated acids such as diethyl maleate and diethyl fumarate; and vinylidene chloride and fluoride. Particularly preferred copolymers are the vinyl chloride/vinyl acetate copolymers which contain up to 20% by weight of polymerized vinyl acetate. Blends of two or more thermoplastic resin polymers may also be used as well as graft polymers formed by grafting an ethylenically unsaturated monomer on to a preformed polymer backbone.

Any necessary or desirable additive may be incorporated into the thermoplastic resin at any stage of its production or subsequent treatment to impart any required appearance, property or combination of properties to the resin. Typical additives include heat stabilizers, light stabilizers, lubricants, processing aids, impact modifiers, fillers, extenders, pigments, dyes and antioxidants.

Particularly useful foamable compositions according to our invention contain 100 parts by weight of a vinyl chloride homo- or co-polymer, 50 to 150 parts by weight of a plasticizer, 1 to 5 parts by weight of a heat stabilizer and 1 to 10 parts by weight of a polysiloxane copolymer according to our invention.

Any suitable plasticizer may be used to prepare the plastisols for use in the compositions according to our invention. Typical plasticzers include alkyl, aryl and alkylaryl esters of acids such as phthalic acid, adipic acid, sebacic acid, trimellitic acid, azelaic acid, lauric acid, caprylic acid, benzoic acid, oleic acid and phosphoric acid. Examples of these esters include dioctyl phthalate, dihexyl phthalate, butyl benzyl phthalate, dioctyl adipate, tricresyl phosphate, dibenzylsebacate, dibutyl sebacate, n-octyl n-decyl adipate, tri-isooctyl trimellitate, tri-isodecyl trimellitate, dipropylene glycol dibenzoate, glyceryl monolaurate, triphenyl phosphate and dialkyl ($C_7$–$C_9$) phthalate. Polymeric plasticizers may also be used such as those currently available under the trade names "Hexoplas" PPA, PPL, LMV, "Ultramoll" I, II and III, "Ultramoll" 3805, "Plastolein" 9714, "Scadoplast" W1 and "Monoplex" S.75.

Epoxy-type plasticizers and chlorinated paraffin oils such as "Paraplex" G62, "Monoplex" S70, "Nuodex" 849, "Peroxidol" 780, "Plastoflex" WSO, "Plastolein" 9213, "Flexol" GPE. "Clophen" A50 and "Cereclor" S45 may also be used. More than one plasticizer may be used if necessary or desired. In addition, the plastisols used in our invention and prepared using a particular plasticizer or plasticizer mixture may be thinned if desired by the incorporation therein of a minor quantity of an organic thinner or diluent.

The profoamers of our invention may be incorporated into the plastisol or plasticizer by merely adding them thereto but are preferably incorporated by adding them as a solution in a solvent. The incorporation may of course be carried out the other way round i.e. by adding the plastisol or plasticizer to the profoamer. Any suitable solvent may be employed, e.g. aromatic organic solvents such as benzene, toluene or xylene or aliphatic organic solvents such as trichlorethylene. Alternatively the solvent may itself be a plasticizer. While the solvent enables a uniform dispersion of the profoamer in the plastisol to be achieved, it takes little or no part in the stabilization of the foam produced from the plastisol—except, of course, where the solvent is itself a plasticizer.

The profoamers of our invention may be prepared by any suitable method. For example, one such method comprises cohydrolyzing a mixture of $R_3SiX$, $RSiX_3$ and $SiX_4$ wherein R is a radical as hereinbefore defined and X is a hydrolyzable group such as a halogen atom e.g. chlorine, bromine, iodine or fluorine. Another method of preparation comprises the addition of a blend of $R_3SiX$ and $RSiX_3$ as defined above in a suitable solvent to a stabilized silica hydrosol. Yet another method of preparation entails the addition of a solution of $R_3SiX$ in a suitable solvent to a stabilized hydrosol of silica and methylsiliconic acid.

In certain cases it may be desirable to reduce the silanol content of the copolymers by one of the methods well known in the art, e.g. by reacting the copolymers with hexamethyldisilazane or other disilazane or with a triorganohalogenosilane such as trimethylchlorosilane.

The foamable compositions of our invention may be foamed by any suitable method, e.g. by the conventional methods mentioned hereinbefore such as mechanically beating or whipping the composition at ambient temperature and pressure, e.g. in a high speed mixer, so as to entrain air therein. Alternatively compressed air may be mixed in with the mechanically agitated composition in an enclosed vessel and this method allows a greater quantity of air to be incorporated into the composition than when the mechanical agitation is carried out at atmospheric pressure. Any additional additives as hereinbefore mentioned to be included in the foamable composition may be conveniently incorporated by adding them to the charge of thermoplastic resin prior to its being converted to a plastisol.

The foamed but still fluid composition is then shaped if necessary e.g. by doctoring into slabs, by spreading or by pouring into an open or closed mould. The foam is then gelled and fused by the application of heat. The heating medium may be dry, e.g. as in infra-red heating or in circulatory air ovens working by convection or may be wet, the transfer of heat being conducted through a fluid medium such as water or oil. The required fusion temperature will of course be dependent on the particular choice of thermoplastic and plasticizer employed and the time necessary to achieve fusion will depend on the heat transfer medium and the thickness and density of the foam being heated. After it has been fused the foam is cooled in order to develop its strength.

Although the presence of the profoamers of our invention in the plastisol compositions of our invention stabilizes the air bubbles in the liquid foamed plastisol for a considerable time, the foam will, on prolonged standing, eventually collapse. It is therefore preferable to gel the thermoplastic and fuse the composition within 10 minutes after the liquid foam has been generated.

The cell structure of the resulting foam after fusing and cooling is usually of the open kind.

When a vinyl chloride polymer is used as the thermoplastic resin the preferred processing procedure is to heat the still fluid foam, having first spread or moulded it into shape, to a temperature of 120 to 210° C. and to keep the foam at that temperature for a period of 30 seconds to 2 hours to gel and fuse the foam. Gelation of the moulded foam may also be achieved as a separate operation e.g. by heating at 60 to 90° C. for a period of 10 seconds to 2 hours. The gelled foam is a weak material which may be fused by further heating at e.g. 150 to 210° C. as a separate operation lasting from 30 seconds to 2 hours. In a particularly preferred processing procedure, the foamed vinyl chloride plastisol composition is rapidly heated to 175° C. which enables gelation and fusion to be completed in about 10 to 15 minutes.

Depending (inter alia) on the efficiency of the method of incorporating air into the foam, the fused foam density usually varies from 0.16 g./ml. to 0.96 g./ml.

The profoamers of our invention have the great advantage that they enable foams of acceptably low foam density to be achieved from plastisols prepared from mixtures of plasticizers over a very wide range of relative proportions of the plasticizer components of any particular mixture. This allows the foam manufacturers a wide choice of relative proportions in order to optimize parameters such as plastisol viscosity, gelation and cost while still retaining the requirement of low foam density.

Our invention is further illustrated by the following examples in which all parts and percentages are by weight.

EXAMPLE 1

This example describes the preparation of a resin consisting essentially of $(CH_3)_3SiO_{1/2}$, $CH_3SiO_{3/2}$, and $SiO_{4/2}$ units in the relative ratios 0.65:0.2:0.8.

A hydrosol was prepared by adding a solution consisting of 655.2 parts of 39.7% sodium silicate solution having $Na_2O:SiO_2$ ratio of 1.0:3.2, 275.4 parts of sodium methylsiliconate solution consisting of $20\pm1\%$ $CH_3SiO_{3/2}$ and 1170 parts of water to a rapidly stirred solution of 2358 parts of $16.5\pm1\%$ hydrochloric acid. After this addition, 783 parts of isopropanol were added immediately to stabilize the hydrosol. The addition of a blend of 341.4 parts trimethylchlorosilane and 211.2 parts xylene was begun immediately following the stabilization of the hydrosol. The resulting partly emulsified reaction product was heated under reflux at 81–82° C. for 2 hours, cooled to 70° C. and 180 parts of xylene added. The stirrer was stopped and the mixture allowed to separate. The lower yellow acid layer was removed and discarded and the upper clear resin solution was distilled to a still-head temperature of 135–140° C. to remove water, hexamethyldisiloxane, isopropanol and a little xylene. The resulting mobile resin solution in xylene was adjusted to 50% solids with xylene.

EXAMPLE 2

A resin consisting essentially of $(CH_3)_3SiO_{1/2}$, $CH_3SiO_{3/2}$, and $SiO_2$ units in the relative ratios 0.65:0.3:0.7 was prepared in the manner described in Example 1 except that 573.1 parts of sodium silicate solution, 413.1 parts of sodium methylsiliconate solution and 1170 parts of water were used in place of the amounts stated in Example 1. The resulting clear, mobile resin solution in xylene was adjusted to 50% solids with xylene.

EXAMPLE 3

A solution of 71 parts of 39.7% sodium silicate solution having a $Na_2O:SIO_2$ ratio of 1.0:3.2 was diluted with 102 parts of water and added with stirring to 81 parts of $16.5\pm1\%$ hydrochloric acid. The resulting hydrosol was stabilized immediately with 85 parts of isopropanol and a blend of 37.6 parts of trimethylchlorosilane, 14.95 parts of methyltrichlorosilane and 47.45 parts of xylene added thereto. The mixture was heated under reflux with stirring for 2 hours, cooled to 70° C and 50 parts of xylene added. The upper clear resin layer was allowed to separate and stripped to remove water and isopropanol and a little xylene to a still-head temperature of 135–140° C. The resulting clear resin solution was adjusted to 50% solids with xylene.

The ratio of $(CH_3)_3SiO_{1/2}:CH_3SiO_{3/2}: SiO_{4/2}$ in the product was 0.965:0.28:1.0.

EXAMPLE 4

100 parts of the 50% resin solution in xylene, prepared as described in Example 3, were mixed with 7 parts of hexamethyldisilazane and the mixture stirred, heated under reflux for 1.5 hours and finally distilled to remove any unreacted hexamethyldisilazane and any hexamethyldisiloxane formed due to moisture reacting with the disilazane. The clear resin solutions so obtained was adjusted to 50% solids with xylene.

EXAMPLE 5

A mixture of 3 parts of the resin prepared as in Example 4 and 7 parts of the resin prepared as in Example 3 was prepared by stirring the two resins together until a homogeneous solution was produced.

EXAMPLE 6

100 parts of the 50% resin solution in xylene, prepared as described in Example 3, were mixed with 2 parts of hexamethyldisilazane and the mixture stirred and heated under reflux for 1.5 hours. Finally the mixture was distilled to remove any excess hexamethyldisilazane and any hexamethyldisiloxane formed due to moisture reacting with the disilazane. The clear resin solution was cooled and adjusted to 50% solids with xylene.

EXAMPLE 7

This example describes the preparation of a liquid thermoplastic foam using a foam forming composition according to our invention.

100 parts of a commercially available paste-grade of vinyl chloride polymer known under the trade name of "Corvic" P65/54 and 100 parts of a commercially available dialkyl phthalate plasticizer (having alkyl groups containing 7 to 9 carbon atoms) were mixed together in a Hobart mixer to form a plastisol. This was achieved by adding 75 parts of the plasticizer to 100 parts of the polymer and mixing for 2 minutes on speed 2 (the Hobart mixer used having 3 speeds of increasing value) followed by the addition of the remaining 25 parts of plasticizer and mixing at speed 2 for 1 minute. The mixer was stopped, the mixer bowl scraped down to remove any powder not mixed with the plasticizer and mixing continued for 2 minutes at speed 2.

4 parts of a polysiloxane profoamer prepared as described in Example 1 were added to the plastisol and mixed into the plastisol for 1 minute at speed 1. The mixer was then fitted with a wire whip and the plastisol whipped for 5 minutes at speed 3 followed by 10 minutes at speed 2 and finally for 5 minutes at speed 1 to refine the foam so formed. The density of the resulting foam was measured by weighing a known volume of the foam and found to be 0.35 g./ml.

EXAMPLE 8

Five foams were prepared by the method described in Example 7 the only difference being that the dialkyl phthalate plasticizer was replaced in four of these by the same amount of a mixture of the dialkyl phthalate and butylbenzyl phthalate and in the case of the other foam by butylbenzylphthalate alone. The proportions of plasticizer and density of the resultant foam together with those of the product of Example 7 are given in Table 1 below.

TABLE 1

| Dialkyl phthalate/butylbenzyl phthalate, parts: | Foam density, g./ml. |
|---|---|
| 100/0 | 0.35 |
| 75/25 | 0.33 |
| 50/50 | 0.35 |
| 30/70 | 0.40 |
| 10/90 | 0.48 |
| 0/100 | 0.48 |

It will be apparent from Table 1 that if a profoamer according to our invention is employed then a suitably low foam density (typically 0.35 g./ml. or less) may be achieved over a wide range of plasticizer mixtures and, in the system exemplified, over the range 100/0 to 50/50 dialkyl phthalate/butylbenzyl phthalate, which is a preferred range for normal formulations, the difference between the maximum (0.35 g./ml.) and the minimum foam density (0.33 g./ml.) is small, i.e. the percentage increase in density of that range is only 6%.

EXAMPLE 9

Four foams were prepared by the method described in Example 7 except that the polysiloxane profoamer was of the kind described in Example 4 and the plasticizer was as indicated in Table 2 below. Table 2 shows the densities of the foams produced and the plasticizer used.

TABLE 2

| Dialkyl phthalate/butylbenzyl phthalate, parts: | Foam density, g./ml. |
|---|---|
| 100/0 | 0.355 |
| 85/15 | 0.360 |
| 70/30 | 0.375 |
| 50/50 | 0.425 |

It will be apparent from Table 2 that the profoamer described in Example 4 is not quite as effective as the profoamer described in Example 1. However this profoamer is effective over a range from 100/0 to 70/30 dialkyl phthalate/butylbenzyl phthalate.

EXAMPLE 10

Five foams were prepared by the method described in Example 7 except that 4 parts of the polysiloxane profoamer described in Example 5 was used and the plasticizer ratios used are as shown in Table 3 below which also shows the foam densities obtained.

TABLE 3

| Dialkyl phthalate/butylbenzyl phthalate, parts: | Foam density, g./ml. |
|---|---|
| 100/0 | 0.33 |
| 85/15 | 0.33 |
| 70/30 | 0.35 |
| 60/40 | 0.38 |
| 50/50 | 0.42 |

It will be apparent from Table 3 that the polysiloxane profoamer described in Example 5 is more effective in producing low density foams and also more effective than the profoamer described in Example 1 (see Table 1) over the range 100/0 to 70/30 dialkyl phthalate/butylbenzyl phthalate.

EXAMPLE 11

Five foams were prepared by the method described in Example 7 except that 4 parts of a polysiloxane profoamer, prepared as described in Example 6, were used instead of the polysiloxane profoamer of Example 1. The ratios of dialkyl phthalate to butylbenzyl phthalate and the foam densities obtained are shown in Table 4 below.

TABLE 4

| Dialkyl phthalate/butylbenzyl phthalate, parts: | Foam density, g./ml. |
|---|---|
| 100/0 | 0.33 |
| 85/15 | 0.322 |
| 70/30 | 0.328 |
| 60/40 | 0.355 |
| 50/50 | 0.40 |

It will be apparent from Table 4 that the profoamer described in Example 6 is more effective over the range 100/0 to 60/40 dialkyl phthalate/butylbenzyl phthalate than the profoamers of Example 1 (Table 1), Example 4 (Table 2) or Example 5 (Table 3).

EXAMPLE 12

Six foams were prepared by the method described in Example 7 except that there were used 4 parts of the polysiloxane profoamer prepared as described in Example 3 instead of that of Example 1. The foam densities and plasticizer ratios are shown in Table 5 below.

TABLE 5

| Dialkyl phthalate/butylbenzyl phthalate, parts: | Foam density, g./ml. |
|---|---|
| 85/15 | 0.43 |
| 70/30 | 0.365 |
| 60/40 | 0.352 |
| 50/50 | 0.35 |
| 40/60 | 0.358 |
| 30/70 | 0.392 |

It will be apparent from Table 5 that the profoamer described in Example 3 gives a useful foam density (0.35 g./ml. to 0.36 g./ml.) from 70/30 to 40/60 of dialkylphthalate/butylbenzyl phthalate thus extending the useful working range of the profoamers to 40/60.

For purposes of comparison three polysiloxane resins not according to the invention and containing only $(CH_3)_3SiO_{1/2}$ and $SiO_{4/2}$ units were prepared.

PRODUCT A

A solution of 91 parts of 39.7% sodium silicate solution having $Na_2O:SiO_2$ ratio of 1.0:3.2 was diluted with 130 parts of water and added with stirring to 81.0 parts of 16.5±1% hydrochloric acid. The resulting hydrosol was stabilized immediately with 87 parts of isopropanol and a blend of 37.8 parts of trimethylchlorosilane and 23.6 parts of xylene added thereto. The mixture was heated under reflux with stirring for 2 hours, cooled to 70° C. and 50 parts of xylene added. The upper clear resin layer was allowed to separate and stripped to remove water and isopropanol and a little xylene to a still-head tempertaure of 135–140° C. The resulting clear solution was adjusted to 50% solids with xylene. The ratio of $(CH_3)_3SiO_{1/2}:SiO_{4/2}$ was 0.66:1.0.

PRODUCT B 100 parts of the product A were mixed with 7 parts of hexamethyldisilazane and the mixture stirred and heated under reflux for 1.5 hours and finally distilled to remove any unreacted hexamethyldisilazane and any hexamethyldisiloxane produced due to moisture reacting with the silazane. The clear resin solution was adjusted to 50% solids with xylene.

PRODUCT C 100 parts of product A were mixed with 2 parts of hexamethyldisilazane and the mixture stirred and heated under reflux for 1.5 hours and finally distilled to remove any unreacted hexamethyldisilazane and any hexamethyldisiloxane produced due to moisture reacting with the disilazane. The clear resin solution was adjusted to 50% solids with xylene.

The following comparisons are included to show the profoamer ability of copolymers of monovalent $(CH_3)_3SiO_{1/2}$ groups and tetravalent $SiO_{4/2}$ groups only.

Fifteen foams were prepared by the method described in Example 7 except that instead of a polysiloxane profoamer according to our invention there was used products A, B or C and the plasticizer was as shown in Table 6 below. Each of these products A, B and C consist essentially of $(CH_3)_3SiO_{1/2}$ and $SiO_{4/2}$ groups, the ratios of which are in the range of 0.66:1 to 0.8:1. The plasticizer ratios and foam densities obtained are shown in Table 6 below.

TABLE 6

| Profoamer (product): | Dialkyl phthalate/butylbenzyl phthalate, parts | Foam density, g./ml. |
|---|---|---|
| A | 70/30 | 0.468 |
|   | 60/40 | 0.410 |
|   | 50/50 | 0.387 |
|   | 40/60 | 0.378 |
|   | 30/70 | 0.378 |
|   | 0/100 | 0.48 |
| B | 100/0 | 0.335 |
|   | 85/15 | 0.360 |
|   | 70/30 | 0.393 |
|   | 60/40 | 0.425 |
| C | 100/0 | 0.355 |
|   | 85/15 | 0.340 |
|   | 70/30 | 0.354 |
|   | 60/40 | 0.385 |
|   | 50/50 | 0.418 |

It will be apparent from Table 6 that product A is not as effective a foaming agent as the polysiloxane profoamer of Example 3 (i.e. one according to our invention).

In addition products B and C are obviously not as effective in producing low density foams as the polysiloxane profoamers of Example 4 and 5 respectively. The latter profoamers are prepared according to our invention.

In all the examples described almost no significant difference in foam stability and cell structure was observed with the exception of the two foams of Example 8 and that shown in Table 6 in which the plasticizer contain more than 80% of butylbenzyl phthalate. Such a plasticizer mixture usually gives a very low viscosity plastisol and high cell drainage rate which leads to rapid cell rupture and consequent foam collapse. It is because of this possibility of foam collapse at high butylbenzyl phthalate concentrations in the plasticizer that the preferred formulations are usually less than 50% butylbenzyl phthalate. This concentration of butylbenzyl phthalate is usually sufficient to give rapid low temperature fusion of the vinyl chloride polymer. Commercial formulations are usually in the range 80/20 to 50/50 dialkyl phthalate/butylbenzyl phthalate.

In the manufacture of P.V.C. foams for commercial carpet backing and other applications it is essential that cheaper secondary plasticizers and fillers are used to keep the production costs to a minimum without any detrimental effect on the product. For example, chlorinated paraffins e.g. "Cereclor" S45 are often used to reduce costs and also have the advantage over primary plasticizers, such as butylbenzyl phthalate, of imparting flame retarding properties to the finished foam. One of the difficulties of using chlorinated paraffins such as "Cereclor" S45 is that most of the known profoamers produce foams which increase in density with increasing substitution of butylbenzyl phthalate by "Cereclor" S45. The profoamers of this invention are capable of accepting high concentrations of cheaper chlorinated paraffins, such as "Cereclor" S45, than the profoamers which consist essentially of $(CH_3)_3SiO_{1/2}$ and $SiO_{4/2}$ units.

The polymer resins used in the commercial manufacture of mechanically frothed foams are often copolymers of vinyl chloride and vinyl acetate which can be fused at temperatures below 140° C. This low temperature fusion is extremely useful for the application of foam to heat sensitive substrates e.g. polypropylene which is being used to a greater extent as a support for carpets, especially tufted carpets.

These copolymers of vinyl chloride and vinyl acetate are more expensive to produce than homopolymers of vinyl chloride. In order to reduce the final price of the foam it is essential that cheaper secondary plasticizers such as "Cereclor" S45 are used in conjunction with the main plasticizers such as dialkyl phthalate and butylbenzyl phthalate without any increase in foam density.

EXAMPLE 13

This example shows a comparison of foam density of foams produced using polysiloxane profoamers prepared as described in Example 6 and product C. The plasticizers used in each case gradually increase in "Cereclor" S45 content.

Texanol isobutyrate (TXIB) is added in a small amount to each example and the plastisols and foams were all prepared using the method described in Example 7 except that the polymer resin used was a copolymer of vinyl chloride/vinyl acetate containing 5–6% of vinyl acetate instead of the homopolymer "Corvic" P65/54. The foam densities and the number of parts of each plasticizer per one hundred parts of vinyl chloride/vinyl acetate copolymer are shown in Table 7.

TABLE 7

| Profoamer | Parts | | | | Foam density (g./ml.) |
|---|---|---|---|---|---|
|  | Dialkyl phthalate | Butylbenzyl phthalate | "Cereclor" S45 | TXIB |  |
| Example 6 | 54 | 36 | 0 | 3 | 0.510 |
|  | 54 | 24 | 12 | 3 | 0.517 |
|  | 54 | 20 | 20 | 3 | 0.494 |
|  | 54 | 18 | 27 | 3 | 0.514 |
| Product C | 36 | 54 | 0 | 3 | 0.577 |
|  | 36 | 42 | 12 | 3 | 0.557 |
|  | 36 | 38 | 20 | 3 | 0.560 |
|  | 36 | 27 | 27 | 3 | 0.584 |

It will be apparent from Table 7 that increasing amounts of "Cereclor" S45 have almost no effect on the foam density when the profoamer of Example 6 is used. However there is a slight increase in foam density with increasing concentration of "Cereclor" S45 when product C is used. Also all the foams made using the Example 6 profoamer were considerably lower in density than those made using product C. Thus the copolymer described in Example 3 which consist essentially of monofunctional $(CH_3)_3SiOC_{1/2}$, trifunctional $CH_3SiO_{3/2}$ and tetrafunctional $SiO_{4/2}$ groups is a more effective profoamer than the copolymer described in product A which consists essentially of monofunctional $(CH_3)_3SiO_{1/2}$ and tetrafuctional $SiO_{4/2}$ groups only.

EXAMPLE 14

This example describes the preparation of a polysiloxane profoamer consisting essentially of $(CH_3)_3SiO_{1/2}$, $C_6H_5SiO_{3/2}$ and $SiO_{4/2}$ units in the relative ratios 0.875: 0.123:1.0.

A solution of 113.4 parts of a 39.7% sodium silicate solution having a $Na_2O:SiO_2$ ratio of 1.0:3.2 was diluted with 162.5 parts of water and added over a period of 3 minutes with stirring to 101 parts of 16.5±1% hydrochloric acid. The resulting hydrosol was stabilized immediately with 55 parts of isopropanol after which a blend of 52.8 parts of trimethylchlorosilane, 14.9 parts of phenyltrichlorosilane and 42.3 parts of xylene was added thereto over a period of 10 minutes. The mixture was heated under reflux with stirring at 81–83° C. for 2 hours, cooled to 70° C. and 28 parts of xylene added.

The upper clear resin layer was allowed to separate and distilled to remove water, isopropanol and a little xylene to a still head temperature of 135–140° C. The resulting clear resin solution was adjusted to 50% solids with xylene. 100 parts of the 50% resin solution in xylene were mixed with 6 parts of hexamethyldisilazane and the mixture heated under reflux for 2 hours and finally distilled to remove any unreacted hexamethyldisilazane and any hexamethyldisiloxane formed due to moisture reacting with the silazane. The clear resin solution was adjusted to 50% solids with xylene.

Plastisols and foams were prepared according to the method described for Example 7 using the polysiloxane profoamer described in Example 14.

The foam densities obtained and the plasticizer concentrations per 100 parts of poly(vinyl chloride) used are given in Table 8.

TABLE 8

| Dialkyl phthalate/butylbenzyl phthalate, parts: | Foam density, g./ml. |
| --- | --- |
| 100/0 | 0.330 |
| 85/15 | 0.328 |
| 70/30 | 0.359 |
| 60/40 | 0.380 |

It will be apparent from Table 8 that a useful foam density can be obtained with the profoamer described in Example 14 over the range 100 parts dialkyl phthalate to 70/30 parts dialkyl phthalate/butylbenzyl phthalate. The foam densities are comparable to those obtained with the profoamer described in Example 6, thus substitution of $C_6H_5SiO_{3/2}$ for $CH_3SiO_{3/2}$ groups has no adverse effect on the properties of the profoamers. The results of foam density plotted against change in plasticizer concentrations are shown in the graph (FIG. 1) and each curve is marked to indicate which polysiloxane profoamer was used.

I claim:

1. A composition suitable for making foams comprising a plastisol of a thermoplastic resin and a foam stabilizer consisting of at least one copolymer consisting of $R_3SiO_{1/2}$, $RSiO_{3/2}$ and $SiO_{4/2}$ units wherein R is a radical selected from the group consisting of alkyl, monocyclic aryl, alkaryl and aralkyl radicals, the ratio of monofunctional units to the total tri- and tetra-functional units being within the range 0.6/1 to 1.5/1 and the ratio of trifunctional units to tetrafunctional units benig within the range 0.05/1 to 1/1.

2. A composition according to claim 1 wherein the thermoplastic resin is selected from the group consisting of homopolymers of vinyl chloride and copolymers of vinyl alkoride with a minor amount of one or more copolymerizable ethylenically unsaturated monomers.

3. A composition according to claim 2 wherein the ethyleneically unsaturated monomer is selected from the group consisting of vinyl acetate, methyl, ethyl and butyl acylates, methyl, ethyl and butyl methacrylates, diethyl maleate, diethyl fumarate, vinylidene chloride and vinylidene flouride.

4. A composition according to claim 3 wherein the thermoplastic resin is a vinyl chloride/vinyl acetate copolymer containing up to 20 percent by weight of copolymerized vinyl acetate.

5. A composition according to claim 2 comprising 100 parts by weight of a vinyl chloride homo- or co-polymer, 50 to 150 parts by weight of a plasticizer, 1 to 5 parts by weight of a heat stabilizer and 1 to 10 parts of a foam stabilizer consisting of at least one copolymer consisting of $R_3SiO_{1/2}$, $RSiO_{3/2}$ and $SiO_{4/2}$ units wherein R is a radical selected from the group consisting of alkyl, monocyclic aryl, alkaryl and aralkyl radicals, the ratio of monofunctional units to the total tri- and tetra-functional units being within the range 0.6/1 to 1.5/1 and the ratio of tri-functional units to tetrafunctional units being within the range 0.05/1 to 1/1.

6. Solid thermoplastic foam articles produced by foaming a composition comprising a plastisol of a thermoplastic resin and a foam stabilizer consisting of at least one copolymer consisting of $R_2SiO_{1/2}$, $RSiO_{3/2}$ and $SiO_{4/2}$ units wherein R is a radical selected from the group consisting of alkyl, monocyclic aryl, alkaryl and aralkyl radicals, the ratio of monofounctional units to the total tri- and tera-functional units being within the range 0.6/1 to 1.5/1 and the ratio of tri-functional units to tetrafunctional units being within the range 0.05/1 to 1/1 and heating the foam so produced to cause gelation and fusion thereof.

References Cited
UNITED STATES PATENTS

| 3,271,331 | 9/1966 | Ender | 260—2.5 F |
| 3,582,391 | 6/1971 | Keil | 260—2.5 P |

MURRAY TILLMAN, Primary Examiner

M. FOELAK, Assistant Examiner

U.S. Cl. X.R.

252—351; 260—30.6 SB, 31.2 R, 31.8 S, 31.8 W, 31.8 HA, 31.8 H, 33.6 SB, 33.6 UA, 33.8 SB, 33.8 UA, 46.5 R, 448.2 R